US008440046B2

(12) United States Patent
Dutsch et al.

(10) Patent No.: US 8,440,046 B2
(45) Date of Patent: May 14, 2013

(54) METHOD FOR FASTENING A PLATE OR GLASS PANEL IN A FRAME ELEMENT AND SEALING ELEMENT FOR USE IN SUCH A METHOD

(75) Inventors: Beat Dutsch, Schliern (CH); Manfred Lehmann, Schmitten (CH)

(73) Assignee: Kaba Gilgen AG, Schwarzenburg (CH)

( * ) Notice: Subject to any disclaimer, the term of this patent is extended or adjusted under 35 U.S.C. 154(b) by 267 days.

(21) Appl. No.: 12/747,736

(22) PCT Filed: Dec. 3, 2008

(86) PCT No.: PCT/CH2008/000508

§ 371 (c)(1),
(2), (4) Date: Jun. 11, 2010

(87) PCT Pub. No.: WO2009/076783

PCT Pub. Date: Jun. 25, 2009

(65) Prior Publication Data

US 2010/0266800 A1 Oct. 21, 2010

(30) Foreign Application Priority Data

Dec. 19, 2007 (CH) .................................... 1970/07

(51) Int. Cl.

| | |
|---|---|
| ***B29C 65/00*** | (2006.01) |
| ***B32B 17/00*** | (2006.01) |
| ***B32B 37/00*** | (2006.01) |
| ***C03C 27/00*** | (2006.01) |
| ***F02F 1/06*** | (2006.01) |
| ***F16J 15/08*** | (2006.01) |
| ***F16J 15/10*** | (2006.01) |
| ***E04C 2/38*** | (2006.01) |

(52) U.S. Cl.
USPC ........ 156/303.1; 156/107; 156/293; 277/652; 52/800.12

(58) Field of Classification Search .................... 156/60, 156/71, 87, 91, 92, 99, 101, 102, 103, 104, 156/106, 107, 108, 109, 242, 243, 244.11, 156/244.13, 244.15, 244.22, 247, 293, 296, 156/303.1, 443, 446, 459, 468, 475, 486, 156/538, 574; 226/14, 24; 277/590, 628, 277/630, 644, 650, 652; 52/782.1, 800.1, 52/800.11, 800.12
See application file for complete search history.

(56) References Cited

U.S. PATENT DOCUMENTS 4,356,676 A * 11/1982 Hauptman ................ 52/396.04
4,409,769 A * 10/1983 Redman ......................... 52/211

(Continued)

FOREIGN PATENT DOCUMENTS

DE 202005003874 U1 7/2006
DE 202006004123 U1 7/2006
GB 1271472 4/1972

*Primary Examiner* — Philip Tucker
*Assistant Examiner* — Brian R Slawski
(74) *Attorney, Agent, or Firm* — The Webb Law Firm

(57) ABSTRACT

The invention relates to a novel method for fastening at least one plate, such as a glass panel, in a profile, which has an assembly groove for peripherally receiving an edge of the glass panel. The method is characterized in that on at least one of the glass panels and an inside of the assembly groove oriented parallel thereto an assembly rubber seal is disposed, on the surface of which facing the glass panel a double-sided adhesive tape having a cover film that covers the side of the double-sided adhesive tape facing the glass panel is attached, wherein the glass panel is inserted into the assembly groove and is pressed against the double-sided adhesive tape in the assembly groove by at least one counter element disposed on the opposite side of the glass panel, or by the opposite inside of the assembly groove, and wherein the cover film is removed when the glass panel is inserted into the assembly groove.

12 Claims, 5 Drawing Sheets

U.S. PATENT DOCUMENTS 4,581,089 A * 4/1986 MacMillan .................. 156/267
4,822,655 A * 4/1989 Foster .......................... 428/41.3
4,987,699 A 1/1991 Gold
5,449,544 A * 9/1995 Ogawa et al. ................ 428/122
5,992,107 A * 11/1999 Poirier ............................ 52/203
6,105,973 A * 8/2000 Butler et al. .................. 277/644
7,217,455 B2 * 5/2007 Valdez .......................... 428/343
2005/0081981 A1 * 4/2005 Heikkila ....................... 156/109

* cited by examiner c)

METHOD FOR FASTENING A PLATE OR GLASS PANEL IN A FRAME ELEMENT AND SEALING ELEMENT FOR USE IN SUCH A METHOD

BACKGROUND OF THE INVENTION

1. Field of the Invention

The present invention relates to a method for fastening a plate, such as for example a glass panel, in a frame element and also to a sealing element or fastening element respectively for use in such a method.

2. Description of Related Art

It is known, for example for doors, gates or windows made of glass, to grasp a glass panel all the way round or only at one (for example only at the top) or more sides with the aid of frame elements or profiles having a groove receiving the glass panel in the edge region.

In this regard, there are various approaches for fastening the glass panel in these frame elements.

Thus, for example, it is possible to fasten, within what is known as wet glazing, the glass panel between the aluminum frame and glass, usually on both sides of the glass, by means of "liquid adhesive" (for example silicone, polyurethane, etc.). That is to say, with regard to the technical properties, this wet glazing has the advantage that the adhesive bonding of aluminum to glass generates a secure connection and that a good sealing property can be achieved. Wet glazing is advantageous with regard to installation because no play-free "padding" of the glass relative to the aluminum frame is necessary and because the broad range of variants of various sealing rubbers is dispensed with.

However, the method also has serious drawbacks, i.e. with regard to the technical properties that the glass edge bond can be adversely influenced by wrongly selected adhesive (degasifications), that the site of adhesion is poorly ventilated and an uncontrolled curing time results, and that quality control is difficult or impossible because it is not possible to inspect the adhesive bonding. With regard to installation, there are the drawbacks that processing is possible only by taking account of the corresponding curing time of the adhesive or sealant system (can take days), that the quality (visual and mechanical) is dependent on the practical skill of the processor, that long interim storage is typically necessary (this, in turn, involves additional space requirement), that a shorter processing time can be achieved in 2-component adhesives, but complex processing equipment is necessary, and intensive cleaning operations become necessary, that there is a possibly large adhesive volume at a large gap width, that an application of the adhesive is disadvantageous in the case of a low gap width between aluminum and glass, and that the glass has to be positioned for adhesive bonding.

There are also drawbacks with regard to maintenance and servicing: If the glass shatters, it is usually possible to reuse the frame only with great effort (the adhesive has to be removed from the aluminum); the site of adhesion has to be separated using a knife.

Alternatively, it is known, as is apparent from US 2005/0081981, for example, to carry out the glazing with the aid of double-sided adhesive tapes. In this case, a double-sided adhesive tape is normally stuck onto the internal flanks of the groove in the frame element; the cover material is subsequently withdrawn from the adhesive tape and the glass panel is inserted. This has the problem, such as is described in US 2005/0081981, that it is almost impossible, unless appropriate specific measures are taken, to fit a panel into a groove, the width dimensions of which are very tight with respect to the thickness of the glass. Nevertheless, this method admittedly generates an adhesive bond producing a secure connection of aluminum (or a different material of the frame element) to glass and a good sealing property is generated. With regard to installation, there is the advantage that no play-free "padding" of the glass relative to the aluminum frame is necessary.

However, there are serious drawbacks with regard to the technical properties:

- There is an increased risk of soiling on account of the open "site of adhesion";
- a broad range of specific seal profiles are necessary;
- the expansion shear force acts 100% on the adhesive surface→the thickness of the adhesive tape must be selected accordingly; this can have an adverse influence on the safety distances.

With regard to installation, there are the drawbacks that the seals have to be cut to size (wastage); that the application of the adhesive tape is complex (no predefined position), that the operations of directing the frame are critical.

There are also drawbacks with regard to maintenance and servicing; that is to say, if the glass shatters, it is usually possible to reuse the frame only with great effort (the adhesive has to be removed from the aluminum) and the site of adhesion has to be separated using a knife.

SUMMARY OF THE INVENTION

As used hereinafter, the term "means" is synonymous with the term "mechanism."

Accordingly, the invention is based inter alia on the object of providing an improved method for installing a glass door, a glass wall or generally a glass panel in a profile and also installation seal rubbers embodied especially for carrying out this method.

Specifically, the aim is to improve a method for fastening at least one glass panel or generally a plate made of glass, wood, metal (aluminum, steel), plastics material or combinations thereof in a profile which has an installation groove for embracingly receiving a rim of the glass panel.

This object is achieved inter alia in that, in a first step, an installation seal rubber, on the surface of which facing the glass panel a double-sided adhesive tape is fastened, is arranged on at least one of the glass panel and the inner side of the installation groove that is oriented parallel thereto. The side of the double-sided adhesive tape that faces the glass panel is in this case covered by the cover film; that is to say, the tacky upper side is not exposed. Now, before the second step is carried out, it may, according to a preferred variant, be advantageous to turn the cover film through 90° in an edge region over a small portion, thus facilitating the concluding removal in the third step.

Now, in a second step, the glass panel is inserted into the installation groove (this is straightforward on account of the fact that the adhesive tape is covered with the cover film), the glass panel being pressed against the double-sided adhesive tape in the installation groove by at least one mating element (for example a mating seal rubber) arranged on the opposite side of the glass panel or by the opposite inner side of the installation groove. In other words, the width of the opening gap of the installation groove is set in such a way that, as early as in this step, the glass panel is pressed into the installation groove, at least partially in a force-transmitting manner. Alternatively or preferably, it is possible that no seal rubber is yet arranged in this second step on the side opposing the installation seal rubber and for this opposite mating seal rubber to be inserted or hauled in after conclusion of the second step.

Now, in a third step, the cover film is removed while the glass panel is inserted in the installation groove and, in other words, a material-uniting fit is additionally produced.

The core of the invention thus consists in the fact that it has been found that it is surprisingly possible, on use of a combined element consisting of an installation seal rubber with a double-sided adhesive tape, on account of the existing resilience of the installation seal rubber, to insert the glass panel in a state in which the cover film is still arranged on the double-sided adhesive tape and, on account of the resilience, it is also possible to extract this cover film from the slot between the glass panel and installation seal rubber when the glass panel is inserted. This greatly facilitates the installation method and allows both force-transmitting and material-uniting fastening of the glass panel in the profile without the usual problems regarding the positioning of the glass panel if the cover film is detached even before the glass panel penetrates, such as is conventional in accordance with the prior art.

A secure bond of the glass to the aluminum frame is therefore produced by means of rubber seal profiles and double-sided adhesive tape (partly by adhesive bonding by means of adhesive tape, partly in a form-fitting manner if the installation seal rubber is additionally fastened to the profile via a form fit, such as will be described hereinafter).

Generally, it should be emphasized, that all references in the present document to a double-sided adhesive tape are intended to include solutions in which an adhesive is directly applied on the side of the installation seal rubber that faces the glass panel and is covered by a cover film.

The following aspects may be listed, inter alia, as advantages of the proposed solution:

Technical Properties:

- Adhesive bonding/form-fittedness of the glass to the abutment rubber generates a secure connection
- Sufficient sealing property
- Expansion shear forces are absorbed between the aluminum (for the case of the use of an aluminum profile) and abutment rubber (does not act directly on the site of adhesion)
- Can be used immediately in the system Installation:

- No play-free "padding" of the glass relative to the aluminum frame necessary
- Installation possible in one operation; curing times do not have to be taken into account
- No specific installation aids or equipment necessary
- Installation seal rubber (with double-sided adhesive tape) is automatically positioned during installation. The tear-off tab is removed from the abutment rubber/installation seal rubber after installation has been completed (compare embodiment hereinafter)
- Uniform quality (visual and mechanical) irrespective of the processor
- No interim storage necessary, less space required
- No specific cleaning operations (removing adhesive residues)

Maintenance/Service

- If the glass shatters, the glass can be replaced without complex removal of glass and cleaning of the aluminum profiles A first preferred embodiment of the method is characterized in that the profile has, on the inner side of the installation groove, first means for fastening the installation seal rubber with its side turned away from the glass panel in a form-fitting, force-transmitting and/or material-uniting manner. Alternatively or additionally, it is preferable for the installation seal rubber to have, for its part, on its side facing the inner side of the installation groove, second means for fastening the installation seal rubber on the inner side of the installation groove in a form-fitting, force-transmitting and/or material-uniting manner. In this case, in the method, the installation seal rubber is fastened to the profile with the aid of the first and/or second means before the glass panel is inserted.

In this regard, according to a preferred embodiment, the first means are at least one groove and/or rib extending longitudinally to the extending direction of the profile, at least in certain portions. Accordingly, the second means are preferably at least one rib and/or groove formed accordingly for mutual engagement, the rib preferably being fastened in the groove via a form fit, if appropriate in combination with a force-transmitting fit and/or material-uniting fit.

It is generally preferable for the installation seal rubber to have a sealing leg which is arranged, in the installed state, between the glass panel and the profile, and which is made of a rubbery-elastic material, thus ensuring sufficient resilience for the subsequent removal of the cover film. This is preferably ensured in that the sealing leg has a thickness of at least 0.5 mm, preferably at least 0.7 mm, in particular preferably in the range of from 0.7-5.0 mm, and is preferably made of a resilient material such as elastomers (natural, synthetic), i.e. for example selected from rubber, thermoplastic elastomer (TPE), ethylene propylene diene monomer (EPDM) rubber, silicone rubber, other elastomeric plastics materials (such as for example polyethylene, polypropylene, polyvinyl chloride, polyamide, polyethylene terephthalate) or a mixture of materials of this type.

Preferably, the installation seal rubber has an abutment projection at least partially covering the leading rim of the installation groove. In this case, the sealing leg and the abutment projection are preferably formed in one piece. In this case, within the method, the installation seal rubber is inserted into the installation groove in such a way that the abutment projection comes to lie flush with the leading rim.

The installation seal rubber can preferably have a tear-off strip which is fastened to the abutment projection by means of a tear-off rim, the sealing leg, abutment projection and tear-off strip preferably forming a profile which is U-shaped, at least in certain portions, and embraces the front portion of the side leg of the installation groove. Within the method, the tear-off strip is torn off before or preferably after the removal of the cover film, so that at the end only the sealing leg and abutment projection remain in the installed state. In other words, the tear-off strip serves only to temporarily fasten and position the installation seal rubber.

The profile is typically an aluminum profile, preferably an aluminum profile which is untreated in the region of the installation groove and is embodied in a U-shaped manner for forming the installation groove perpendicularly to the extending direction.

A second installation seal rubber is arranged on the side of the installation groove that opposes the installation seal rubber, preferably before the glass panel is inserted, or a mating seal rubber is arranged on the opposite side of the installation groove before the insertion of the glass panel, this mating seal rubber preferably being fastened to the profile (as was described above for the installation seal rubber) and/or the mating seal rubber preferably having at least one, preferably a plurality of sealing ribs facing the glass panel in order to ensure increased resilience and in this way easier removal of the cover film.

Typically, padding rubbers are inserted before the glass panel is inserted into the bottom of the installation groove.

Furthermore, the present invention relates to an installation seal rubber, in particular preferably for use in a method such as has been described above. The installation seal rubber is preferably characterized in that it has a sealing leg (in the form of a strip extending parallel to the extending direction of the profile) which is arranged, in the installed state, between the glass panel and the profile, is made of a rubbery-elastic material and preferably has a thickness of at least 0.5 mm, preferably at least 0.7 mm, in particular preferably in the range of from 0.7 to 5.0 mm (made of the above-specified materials), in that it has an abutment projection which, in the installed state, at least partially covers the leading rim of the installation groove, the sealing leg and the abutment projection preferably being formed in one piece, and in that a double-sided adhesive tape with a cover film is arranged on the side of the sealing leg that faces the glass panel. Preferably, the cover film is highly tear-resistant. Thus, it can for example be made of prestretched material (for example stretched polyethylene). Thus, the product 9088FL from 3M is for example suitable as the double-sided adhesive tape. This ensures that the film is extracted from the gap without difficulty.

Alternatively, it is also possible for a liquid (hot-melt) adhesive to be applied instead of the double-sided adhesive tape and for the liquid adhesive to be covered with (highly tear-resistant) cover film.

Preferably, the installation seal rubber has a tear-off strip which is fastened to the abutment projection by means of a tear-off rim. In this case, the sealing leg, abutment projection and tear-off strip preferably form a profile which is U-shaped, at least in certain portions, and embraces the front portion of the side leg of the installation groove in the installed state. Preferably, the sealing leg, abutment projection and tear-off strip are formed in one piece. Furthermore, the pair-off rim is preferably a material tapering which is arranged parallel to the extending direction of the profile and in which, for example, the material has a thickness of less than 0.5 mm, preferably of less than 0.3 mm, or alternatively or additionally a perforation can also be used.

Furthermore, the present invention relates to a glass panel, glass door or glass wall with an installation seal rubber such as has been described above or manufactured using a method as has been described above.

Further preferred embodiments of the invention are described in the dependent claims.

BRIEF DESCRIPTION OF THE DRAWINGS

The invention will be described hereinafter in greater detail based on exemplary embodiments in relation to the drawings, in which.

DETAILED DESCRIPTION OF THE INVENTION

The invention, such as it is defined in the appended claims and has generally been described above, will be presented hereinafter with reference to the figures and within the scope of exemplary embodiments. The figures and the following description should in this regard be consulted merely to explain the invention and not to limit the protected idea, such as it is specified in the claims.

Figure 1:
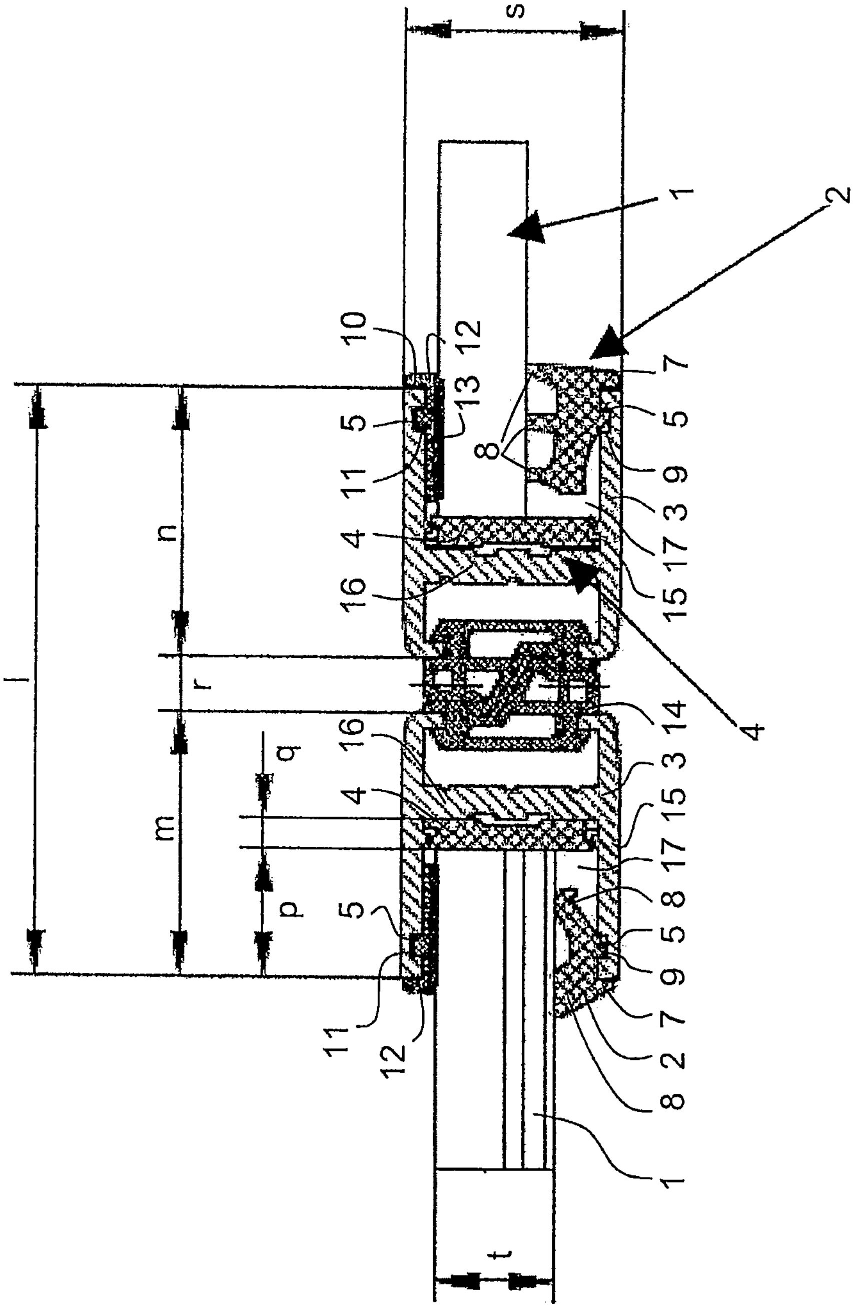
FIG. 1 is a section perpendicular to the extending direction of a frame profile in the sealing region between two door leaves with glass panels.

FIG. 1 is a section perpendicular to the extending direction of two aluminum profiles 3. The two aluminum profiles have, on a side facing in each case the glass panel 1, an installation groove 17 extending parallel to the extending direction of the profiles 3. A further groove, into which sealing lips 14 can be inserted and fastened therein in a form-fitting manner, is arranged on the respectively opposite side. That is to say, the two profiles are two oppositely arranged profiles of a sliding door and the section runs through the contact region when the door is closed; that is to say, two at least partially mutually engaging sealing lips 14 are arranged in the region of the closing rim.

In other words, the profiles 3 are embodied as H-shaped profiles, there being arranged two longitudinal carriers 15 which are arranged substantially parallel to each other and a transverse carrier 16 which is arranged between the longitudinal carriers, perpendicularly thereto, and connects them.

The installation groove 17, into which the glass panel 1 is inserted and fastened therein, is therefore formed between the two longitudinal carriers 15.

What are known as padding rubbers 4, which are inserted in the corresponding thicknesses as required, are arranged, typically in portions, for setting the distance between the end side of the glass panel 1 and the transverse carrier 16. The padding rubbers can be fastened in the installation groove 17 via corresponding projections or the like.

The two transverse carriers 16 have on their inner side, that is to say on the side facing the installation groove 17, two opposing grooves 5 arranged parallel to the extending direction. The grooves serve to fasten the installation seal rubber 10 or the opposite mating seal rubber 2.

The installation seal rubber 10 is arranged in the region of the leading rim, that is to say in the end region of the longitudinal carriers 15 that faces the exposed glass panel 1. The installation seal rubber has in this case, at least in certain portions, a rib 11 which engages with the aforementioned groove 5 and ensures a form-fitting mounting of the installation seal rubber 10. Furthermore, the installation seal rubber 10 has an abutment projection 12 at least partially covering the leading rim of the longitudinal carrier 15.

A double-sided adhesive tape 13 is arranged on the side of the installation seal rubber 10 that faces the glass panel. The installation seal rubber 10, the arrangement of the double-sided adhesive tape and also the installation method are described in detail hereinafter.

A mating seal rubber 2 (wedge seal) is arranged opposite the installation seal rubber 10. On the right-hand side of FIG. 1, this mating seal rubber 2 is also embodied with a rib 9 which engages with the opposite groove 5 and also serves to mount the mating seal rubber 2 on the longitudinal carrier 15. The mating seal rubber 2 also has an abutment projection 7. On the side facing the glass panel, the mating seal rubber 2 has protruding sealing ribs 2 which ensure that the glass panel 1 is mounted in the installation groove 17 in a manner which transmits forces as effectively as possible but is still resilient.

In the exemplary embodiment indicated on the opposite side, that is to say on the left-hand side, the mating seal rubber 2 is equipped, on the side facing the glass panel, with just two sealing ribs 8 of this type.

In the present case, the total profile depth over both profiles is for example in the range of l=40-100 mm, the individual profiles having a depth in the range of m=n=20-40 mm. The distance r between the two profiles is normally small, that is to say in the range of less than 10 mm. Typically, the depth of the installation groove 17 is in the range of p+q=10-25 mm, wherein the padding rubber 4 can have a thickness q in the range of from 1-10 mm, for example. The outer distance s of the two longitudinal carriers 15 is for example in the range of from 15-30 mm and the inner clear width of the installation groove 17 that is available for the thickness t of the glass is, taking account of the two rubbers 2, 10, in the range of from 5-15 mm.

Figure 2:
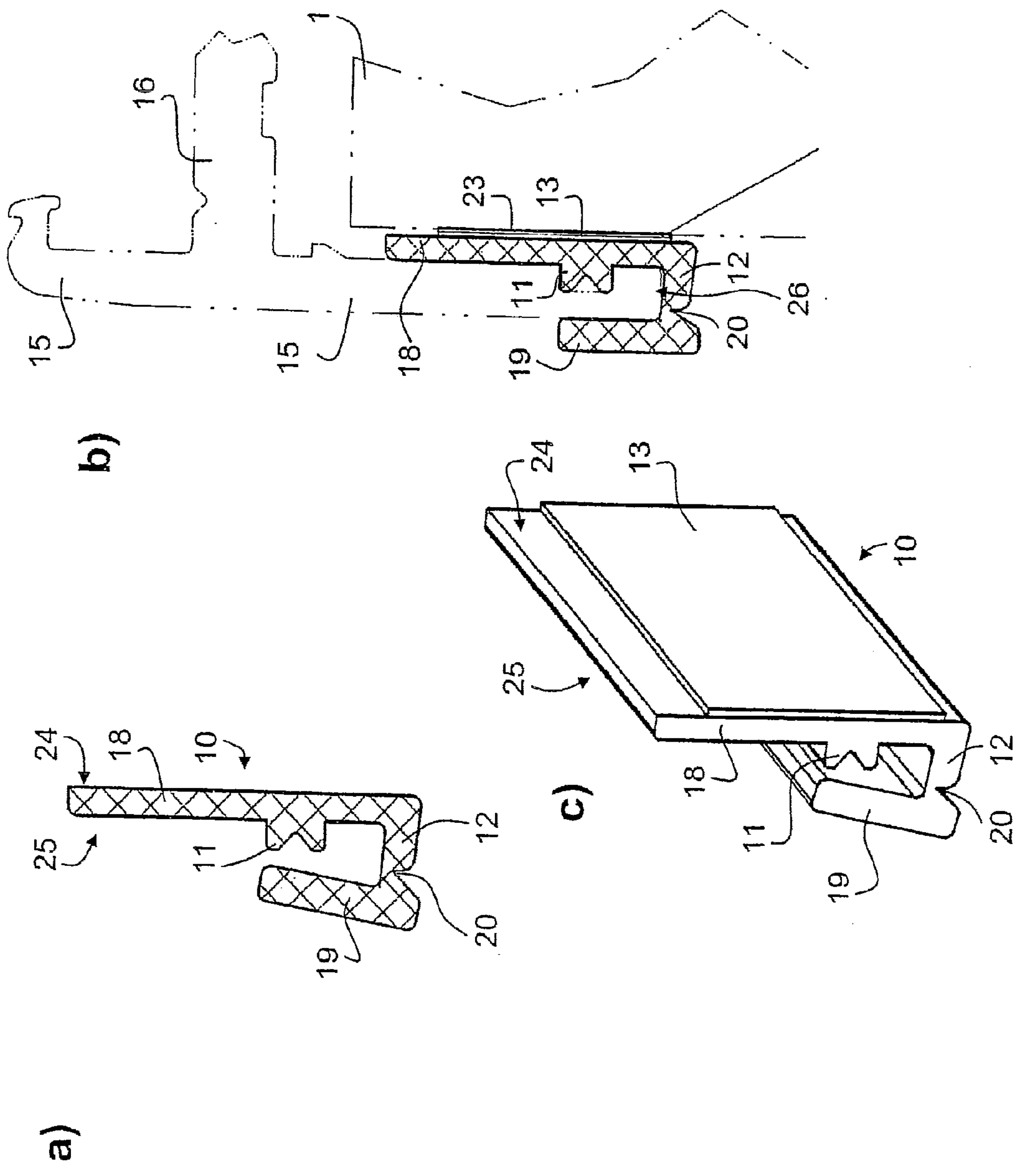
FIG. 2 are various views of a sealing element, a) being a section perpendicular to the extending direction, b) also being a section perpendicular to the extending direction with a schematically indicated profile element and c) being a perspective view onto a portion.

FIG. 2 shows the installation seal rubber 10 in detail. The installation seal rubber has a sealing leg which is arranged substantially parallel to the longitudinal carrier 15. At the side shown at the bottom in FIG. 1*a*, the sealing leg 18 merges with the abutment projection 12 substantially at right angles. The abutment projection tapers at the outer left end, so as to form a tear-off edge 20, down to a much lower material thickness allowing the subsequent tear-off strip 19 to be torn off after the glass panel 1 has been installed. The tear-off strip is provided for positioning the installation seal rubber 10 and embraces the leading rim 26 of the longitudinal carrier 15 of the profile 3. In other words, it provides on the sealing leg 18 a surface 25 which is turned away from the glass panel and faces the longitudinal carrier 15 and a surface 24 facing the glass panel.

Figure 3:
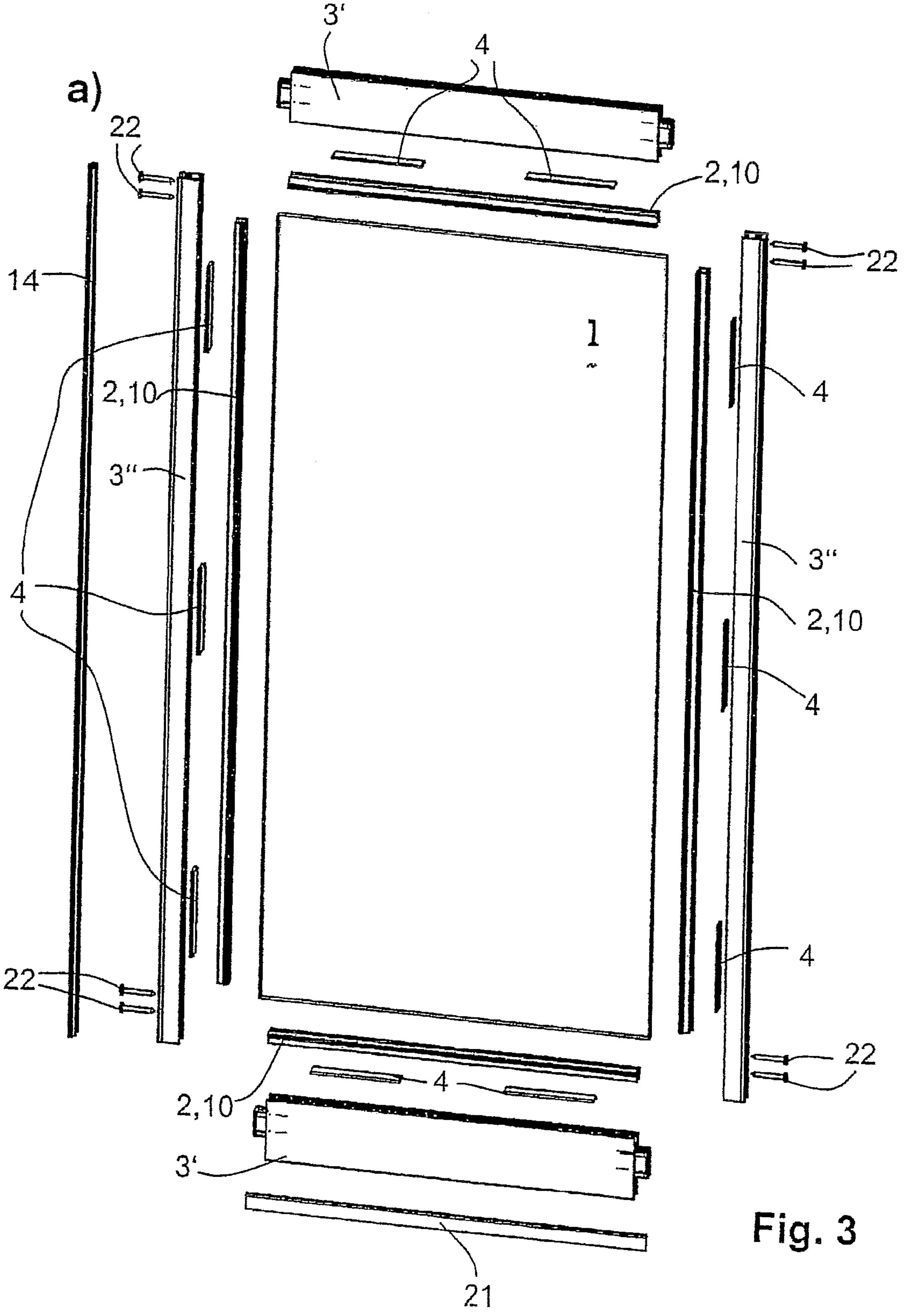
FIG. 3 shows the individual installation steps a)-c).
Figure 3:
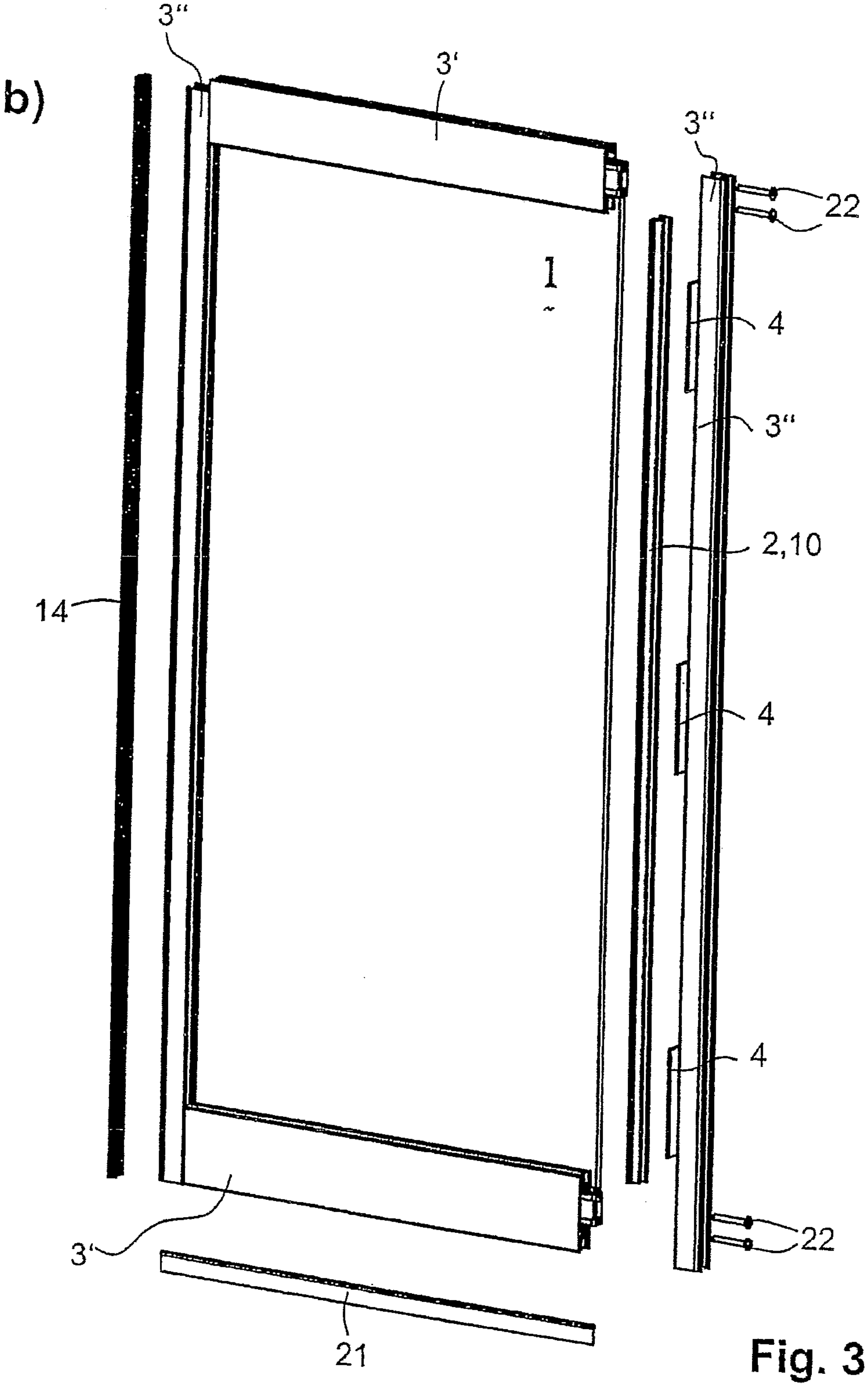
Figure 3:
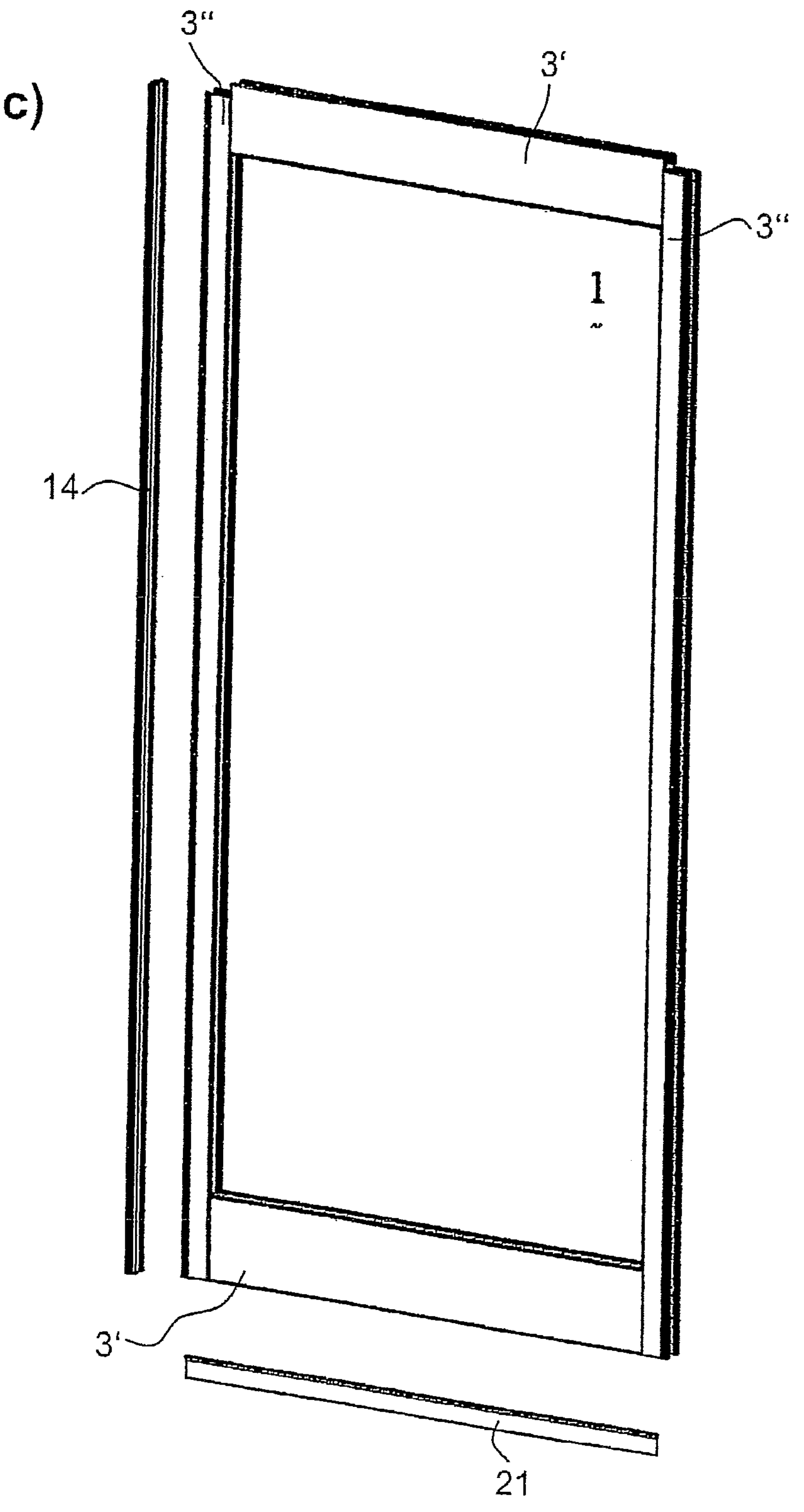

In other words, as may be seen from FIG. 2*b*, which also shows schematically a part of the profile 3, the installation seal rubber 10 embraces the leading rim 26 before the last installation step (compare the discussion of FIG. 3 hereinafter), that is to say before the cover film 23 is removed from the double-sided adhesive tape 13 arranged on the side 24 and before the tear-off strip 19 is removed.

Furthermore, it is possible to see how the rib 11 engages with the corresponding recess 5. In order to complete installation, the extraction of the cover film 23 and the tearing-off of the tear-off strip 19 would now still have to be carried out as steps following the illustration according to FIG. 2*b*).

FIG. 2*c*) is a perspective view showing that the double-sided adhesive tape 13 is arranged over the entire length of the profile of the installation seal rubber 10. Generally, the installation seal rubber 10 is preferably an endless profile which is cut to size as required.

The individual installation steps (installation procedure, fitting of the glass) will be illustrated with reference to FIGS. 3*a*)-*c*).

FIG. 3*a*):

cut the installation seal rubber 10 to size with oversize prepare padding rubbers 4 clean glass 1 in edge region using special glass cleaner (site of adhesion of the installation seal rubber)

1. Place aluminum profiles 3' and 3"
2. Roll padding rubbers 4 into all profiles (distance between padding rubbers approx. 700 mm)
3. Insert profile connectors into both H-shaped profiles 3' on both sides until abutment
4. Install installation seal rubbers 10. Horizontal rubbers same length as aluminum profile. Cut vertical rubbers to same length as profiles and cut to length by means of cutting pliers
5. Turn cover film 23 of double-sided adhesive tape 13 approx. 30-50 mm through 90° at both ends FIG. 3*b*):

6. Screw profile left 3" and both profiles 3' together, tighten screws 22 just slightly
7. Screw upper profile 3' to the left profile 3'
8. Slide assembled U over glass
9. Install right profile 3"
10. Check that abutment rubber has not been displaced
11. Check whether all the turned cover films 23 are in correct position
12. Tighten all the screws 22 to a defined tightening torque. Check whether profiles are aligned neatly with one another
13. Raise frame and insert auxiliary pads or wedges between the frame and glass FIG. 3*c*):

14. Slide vertical profile 3" left (NSK) and shoe profile of padding rubber toward glass→play-free (owing to transportation)
15. Roll in mating seal rubbers 2 of the vertical profiles 3". Make sure that enough counterpressure is generated during rolling-in to prevent the profiles from bending outward. Make sure that if possible no soap water runs into the region of the installation seal rubber
16. Roll in mating seal rubbers 2 of the horizontal profiles 3"
17. Check that vertical profiles 3" are straight using an aiming stake; correct if necessary
18. Check angularity by means of diagonal measurement; correct if necessary
19. Check whether leaf is flat and does not sag
20. Extract cover film 23 from double-sided adhesive tape 13 between glass and abutment rubber
21. Tear off tear-off strip 19 from installation seal rubber 10
22. Carry out remaining integration of brush 21 and blade List of Reference Numerals

1 glass panel
2 mating seal rubber, wedge seal
3 aluminum profile
4 padding rubber
5 groove in 3
7 abutment projection on 2
8 sealing ribs on 2
9 rib on 2
10 installation seal rubber, abutment rubber
11 rib on 10
12 abutment projection on 10
13 double-sided adhesive tape
14 sealing lips
15 longitudinal carrier of 3, side leg of 5
16 transverse carrier of 3
17 installation groove of 3
18 sealing leg of 10
19 tear-off strip
20 tear-off rim
21 lower sealing lip, brush
22 screws
23 cover film
24 surface of 10 that faces the glass panel
25 surface of 10 that is turned away from the glass panel
26 leading rim of the installation groove

The invention claimed is:

1. A method for fastening at least one plate made of glass, wood, metal, plastics material or combinations thereof, in a profile which has an installation groove for embracingly receiving a rim of the plate, wherein an installation seal rubber is arranged on at least one of the plate and an inner side of the installation groove that is oriented parallel thereto, wherein on a surface of the installation seal rubber facing the plate a double-sided adhesive tape having a cover film covering a side of the double-sided adhesive tape that faces the plate is fastened, wherein the plate is inserted into the installation groove and pressed in the process against the double-sided adhesive tape in the installation groove by at least one mating element arranged on an opposite side of the plate or by an opposite inner side of the installation groove, and wherein the cover film is removed when the plate is inserted in the installation groove, wherein the installation seal rubber has a sealing leg which is arranged, in the installed state, between the plate and the profile, and is made of a rubbery-elastic material, wherein the installation seal rubber has an abutment projection at least partially covering a leading rim of the installation groove, the sealing leg and the abutment projection being formed in one piece and the installation seal rubber being inserted into the installation groove in such a way that the abutment projection comes to lie flush with the leading rim, wherein the installation seal rubber has a tear-off strip which is fastened to the abutment projection by means of a tear-off rim, the sealing leg, abutment projection and tear-off strip and wherein the tear-off strip is torn off before or after the removal of the cover film.

2. The method as claimed in claim 1, wherein the profile has, on the inner side of the installation groove, a first mechanism for fastening the installation seal rubber with its side turned away from the plate in a form-fitting, force-transmitting or material-uniting manner or wherein the installation seal rubber has, on its side facing the inner side of the installation groove, a second mechanism for fastening the installation seal rubber on the inner side of the installation groove in a form-fitting, force-transmitting or material-uniting manner and wherein the installation seal rubber is fastened to the profile with the aid of the first and/or second mechanism before the plate is inserted.

3. The method as claimed in claim 2, wherein the first mechanism is at least one groove or rib or a groove and a rib extending longitudinally to an extending direction of the profile, or wherein the second mechanism is at least one rib or groove or a groove and a rib formed accordingly for mutual engagement.

4. The method as claimed in claim 1, wherein the profile is an aluminum profile which is untreated in a region of the installation groove and is embodied in a U-shaped manner for forming the installation groove perpendicularly to an extending direction.

5. The method as claimed in claim 1, wherein a second installation seal rubber is arranged on a side of the installation groove that opposes the installation seal rubber before the plate is inserted or wherein a mating seal rubber is arranged on the opposite side of the installation groove before the insertion of the plate.

6. The method as claimed in claim 1, wherein padding rubbers are inserted before the glass panel is inserted into the bottom of the installation groove.

7. The method as claimed in claim 1, wherein no seal rubber is yet arranged on a side of the installation groove that opposes the installation seal rubber after the insertion of the plate and before the withdrawal of the cover film and wherein an opposite mating seal rubber is inserted or rolled in after conclusion of the second step.

8. The method as claimed in claim 2, wherein the first mechanism is at least one groove or rib or a groove and a rib extending longitudinally to an extending direction of the profile, or wherein the second mechanism is at least one rib or groove or a groove and a rib formed accordingly for mutual engagement, the rib being fastened in the groove via a form fit.

9. The method as claimed in claim 1, wherein the installation seal rubber has a sealing leg which is arranged, in the installed state, between the plate and the profile, is made of a rubbery-elastic material and has a thickness in the range of from 0.7-5.0 mm.

10. A method for fastening at least one plate made of glass, wood, metal, plastics material or combinations thereof, in a profile which has an installation groove for embracingly receiving a rim of the plate, wherein an installation seal rubber is arranged on at least one of the plate and an inner side of the installation groove that is oriented parallel thereto, wherein on a surface of the installation seal rubber facing the plate a double-sided adhesive tape having a cover film covering a side of the double-sided adhesive tape that faces the plate is fastened, wherein the plate is inserted into the installation groove and pressed in the process against the double-sided adhesive tape in the installation groove by at least one mating element arranged on an opposite side of the plate or by an opposite inner side of the installation groove, and wherein the cover film is removed when the plate is inserted in the installation groove, wherein the installation seal rubber has a sealing leg which is arranged, in the installed state, between the plate and the profile and is made of a rubbery-elastic material wherein the installation seal rubber has an abutment projection at least partially covering a leading rim of the installation groove, the sealing leg and the abutment projection being formed in one piece and the installation seal rubber being inserted into the installation groove in such a way that the abutment projection comes to lie flush with the leading rim, wherein the installation seal rubber has a tear-off strip which is fastened to the abutment projection by means of a tear-off rim, the sealing leg, abutment projection and tear-off strip forming a profile which is at least partially U-shaped and embraces a front portion of the side leg of the installation groove and wherein the tear-off strip is torn off after the removal of the cover film.

11. The method as claimed in claim 1, wherein a second installation seal rubber is arranged on a side of the installation groove that opposes the installation seal rubber before the plate is inserted or wherein a mating seal rubber is arranged on the opposite side of the installation groove before the insertion of the plate, the mating seal rubber being fastened to the profile or the mating seal rubber having at least one sealing rib facing the plate.

12. A method for fastening at least one plate made of glass, wood, metal, plastics material or combinations thereof, in a profile which has an installation groove for embracing receiving a rim of the plate, wherein an installation seal rubber is arranged on at least one of the plate and an inner side of the installation groove that is oriented parallel thereto, wherein on a surface of the installation seal rubber facing the plate a double-sided adhesive tape having a cover film covering a side of the double-sided adhesive tape that faces the plate is fastened, wherein the plate is inserted into the installation groove and pressed in the process against the double-sided adhesive tape in the installation groove by at least one mating element arranged on an opposite side of the plate or by an opposite inner side of the installation groove, and wherein the cover film is removed when the plate is inserted in the installation groove, wherein the installation seal rubber has a sealing leg which is arranged, in the installed state, between the plate and the profile, and which is made of a rubbery-elastic material and has a thickness of at least 0.5 mm, wherein it has an abutment projection which, in the installed state, at least partially covers a leading rim of the installation groove, the sealing leg and the abutment projection being formed in one piece, and wherein the double-sided adhesive tape with a cover film is arranged on a side of the sealing leg that faces the plate, wherein the installation seal rubber has a tear-off strip which is fastened to the abutment projection by means of a tear-off rim, the sealing leg, abutment projection and tear-off strip forming a profile which is at least partially U-shaped and embraces the front portion of the side leg of the installation groove in the installed state.

* * * * *